United States Patent Office 3,509,168
Patented Apr. 28, 1970

3,509,168
PROCESS FOR EXTRACTING 6-AMINO-PENICILLANIC ACID FOR PRODUCTION OF PENICILLINS
Clarence C. Christman, Broomall, and Charles A. Robinson, West Chester, Pa., assignors to American Home Products Corporation, New York, N.Y., a corporation of Delaware
No Drawing. Filed Dec. 13, 1967, Ser. No. 690,108
Int. Cl. C07d 91/14
U.S. Cl. 260—306.7                          7 Claims

ABSTRACT OF THE DISCLOSURE

A process for preparing derivatives of 6-aminopenicillanic acid from aqueous solutions of the latter by treatment of said solutions with an aliphatic amine selected from a large class of secondary and tertiary amines, in a non-reactive water-immiscible solvent devoid of hydroxyl groups. The resulting 6-aminopenicillanic acid derivatives in the solvent are useful directly in the preparation of antibiotically active penicillins, e.g., by the "silyl route," without the necessity for isolation of the 6-aminopenicillanic acid in solid form and/or transfer into another solvent for such use.

BACKGROUND OF THE INVENTION

This invention relates generally to the production of semi-synthetic penicillins and more particularly to the preparation, from aqueous solutions containing 6-aminopenicillanic acid (6-APA), of a derivative form of said 6-APA in organic solvent solutions useful per se in the synthesis of penicillins generally, and particularly by the "silyl route."

In U.S.P. 3,008,956 there is disclosed a process for isolating 6-APA from dilute aqueous solutions, such as filtered fermentation broths, by extraction with an amine in an organic solvent, followed by recovery of the 6-APA from the extract. However, in accordance with that patent, the amine is required to be of a specified group of secondary aliphatic amines, the solvent is required to be a substantially water-immiscible aliphatic alcohol, preferably n-butanol, and the extraction is undertaken with the two-phase system at a pH within the range of from 5 to 7. After separation of the organic solvent phase from the aqueous phase, the solvent phase is then extracted with a lesser amount of water at a pH of from 1 to 3 to obtain the 6-APA in concentrated aqueous acidic solution from which said 6-APA may then be precipitated by adjustment of the acidic solution of pH 4.3 with sodium hydroxide, followed by collection by filtration.

In U.S.P. 3,008,955 there is disclosed a process for isolating 6-APA from dilute aqueous solutions including filtered fermentation broths by extraction with a specified class of petroleum sulfonates in an organic solvent system comprising any of a specified group of water-immiscible alcohols, esters, ketones or ethers. In this patent, as in U.S.P. 3,008,956, the 6-APA is extracted into concentrated aqueous solution from which the solid form of 6-APA is then precipitated and collected by filtration.

Alternatively, 6-APA can be isolated in crystalline form by concentrating dilute aqueous solutions to a small volume and precipitation by adding an acid.

Hence, the prior art methods result either in alcoholic solutions of 6-APA amine salts, organic solvent solutions of petroleum sulfonates of 6-APA, concentrated aqueous solutions of 6-APA, or isolated solid 6-APA. Of these, only solid 6-APA, after drying, is suitable for use in the preparation of penicillins by acylation methods which require essentially anhydrous conditions and non-hydroxylic solvents. The use of solid 6-APA as a starting material for processes, such as the "silyl route" as described in U.S.P. 3,249,622, involves, besides isolation from aqueous solution, the additional step of converting the 6-APA into an amine salt in an organic solvent devoid of hydroxyl groups.

SUMMARY OF THE INVENTION

With the foregoing and other disadvantages of the prior art methods for isolating 6-APA from dilute solutions thereof in mind, it is a primary object of the present invention to provide a method for transferring 6-APA from aqueous solutions into organic solutions in a form which can be used directly in an acylation process for the preparation of penicillins without the necessity for going through a sequence of steps for isolating 6-APA in its solid crystalline form followed by redissolving the dried 6-APA in a suitable anhydrous organic solvent prior to use. It is a concomitant object of the invention to provide a method for preparing solutions of derivatives of 6-APA, which per se may be utilized in subsequent acylation procedures for preparing penicillins generally, and particularly via the "silyl route" for obtaining said penicillins.

In accordance with the present invention, there is provided a method for preparing an organic solvent solution of a derivative of 6-APA suitable for use in subsequent procedures, including acylation for obtaining penicillins, which method comprises: providing an aqueous solution of 6-APA; mixing this solution with an aliphatic amine of the type described hereinafter dissolved in a substantially water-immiscible organic solvent which is devoid of hydroxyl groups, at a pH from about 3 to about 7; and then separating the organic solvent phase containing the corresponding aliphatic amine derivative of 6-APA.

The aqueous solutions of 6-APA contemplated by the present invention include those obtained by fermentation, enzymatic hydrolysis, or other processes now known for hydrolyzing a natural penicillin, wherein 6-APA is formed. The 6-APA may be present as such in the solution, or in the form of a salt thereof; i.e., either as a salt wherein there is substitution, at the carboxylic group, of a cation, such as sodium; or as an acid-addition salt of, for example, a mineral acid. The 6-APA broth may be filtered, and impurities, including other hydrolysis products and unhydrolyzed penicillins, may be removed therefrom by organic solvent extraction processes.

The efficiency of the process by the method of the invention depends, among other factors, on the particular acid used for acidification, the amount of acid, and the inorganic salts present in the system. In the acidification of the aqueous solutions of 6-APA, or the adjustment of the pH of the mixture after adding the amine solution, dilute solutions of sulfuric acid, hydrochloric acid, hydrobromic acid, or nitric acid have been found suitable although sulfuric acid is preferred. In this connection, it has been found that the amount of acid used is more significant than the pH during extraction. The amount of acid can be varied such that from 0 to 3 or more equivalents are present per mole of amine extractant (pH approximately 1 to 7). Optimum results are obtained, however, in the range of about 0.2 to 0.6 equivalent of acid per mole of amine (pH approximately 3.5 to 6.5) although the most efficient amount depends on the particular amine employed and the other components of the system. Although hydrochloric, hydrobromic or nitric acid do not adversely effect the process when used in the partial neutralization of the amine extractant, the efficiency of the process has been found to be markedly inhibited by the presence of salts of hydrochloric acid and particularly hydrobromic and nitric acid, such as sodium or potassium chloride, sodium or potassium bromide and sodium or potassium nitrate, which will be formed in the acidification of 6-APA broths containing inorganic cations. However, salts of sulfuric acid, such as sodium or potassium sulfate, do not appear to interfere significantly.

The aliphatic amines, useful in the method of the invention, as mentioned hereinbefore may be any aliphatic secondary or tertiary amine, which may be straight or branch-chain, saturated or unsaturated, symmetrical or unsymmetrical, but which must have at least 12 carbon atoms and a molecular weight of at least about 185. Illustrative of suitable amines falling within the described category, which, however, is not to be construed as necessarily limited thereto, are those given in Table A below:

TABLE A

| | M.W. |
|---|---|
| Secondary: | |
| Dihexyl | 185 |
| Di-n-octyl | 241 |
| Di-2-ethylhexyl | 241 |
| Di-lauryl | 353 |
| Amberlite LA-1 | 368 |
| Amberlite LA-2 | 370 |
| Tertiary: | |
| Tributyl | 185 |
| Dimethyldodecyl | 213 |
| Tri-isoamyl | 227 |
| Trihexyl | 269 |
| Dimethyloctadecyl | 298 |
| Tri-octyldecyl | 408 |
| Amberlite XE-204 | 448 |
| Tri-lauryl | 520 |

In the Table A above, Amberlite LA-1 is an aliphatic unsymmetrical branched chain unsaturated secondary amine, Amberlite LA-2 is similar to Amberlite LA-1 except that the former is a saturated secondary amine, and Amberlite XE-204 is generally similar to Amberlite LA-2 except that it is a tertiary amine.

Amines of lower molecular weight, such as diamylamine (M.W. 157), diisoamylamine (M.W. 157), and dicyclohexylamine (M.W. 181), and aralkyl amines, such as dibenzyl amine, tribenzylamine and dibenzylmethylamine, have not been found to be particularly useful in the method of the invention.

The amount of amine used can be varied from about one to five or more moles per mole of 6-APA present in the aqueous solution. Although the efficiency of the process increases with the proportion of amine employed, there is no significant advantage in using more than about four moles of amine per mole of 6-APA.

The organic solvent for the selected amine may be any suitable substantially water-immiscible solvent devoid of hydroxyl groups. For example, although methylene chloride, ethyl acetate, chloroform and ethylene dichloride, are preferred, such other solvents as carbon tetrachloride, cyclohexane, benzene, toluene, diethyl ether, methylisobutylketone, and others may be used. The amount of organic solvent used can be varied widely, but 20–50% of the volume of the aqueous 6-APA solution has been found to be practical. The selection of the solvent may be based on its solvency characteristics with respect to the reactants to be incorporated into the reaction medium during subsequent processing steps, such as those referred to hereinafter.

The process is carried out by mixing the organic and aqueous solutions thoroughly for a short time, preferably under an inert atmosphere, and then separating the phases. Although the extraction can be performed at any convenient temperature, 20–25° C. has been found to be practical in most cases. The efficiency of the process is increased by repeated or continuous extraction procedures.

The sequence of addition of the amine, and of the mineral acid when indicated, is not critical to the method of the invention. Thus, some or all of the mineral acid in the solution containing the 6-APA may be present due to its prior introduction at some time during the preparation and/or processing of the 6-APA solution per se. Alternatively, some or all of the mineral acid may be added to the solution of 6-APA to be treated, prior to the addition of the amine thereto, or subsequently thereto, or simultaneously therewith. The sole criteria for the presence of, or addition sequence for the introduction of, the mineral acid in or to the solution are the practicalities involved in assuring that the appropriate pH range and molar equivalency proportions of the mineral acid in relation to the amine, and the amine to 6-APA, as referred to hereinbefore, are achieved for the advantageous exercising of the method of the invention.

The organic solvent solutions of the derivatives of 6-APA produced in accordance with the process described hereinbefore may be utilized in subsequent acylation procedures for preparing penicillins. As also referred to hereinbefore, the solutions containing the 6-APA derivatives are particularly suitable for use in preparing penicillins via the "silyl route." For such purpose, the solutions are preferably dried by any suitable means, reacted with a silylating agent to form a silylated 6-APA and then converted into a penicillin by acylation with an appropriate acylating agent as disclosed in U.S.P. 3,249,622. The solutions of the present invention are also useful for reaction with a tri(lower)alkylchlorosilane and preferably trimethylchlorosilane, to form a silylated 6-APA, which may then be converted to an α-amino-penicillin by acylation with a suitable chloride hydrochloride, as described in U.S. Ser. No. 671,951, "Process for Preparing α-Amino Penicillins," of C. A. Robinson and J. J. Nescio, filed Oct. 2, 1967, and U.S. Ser. No. 671,938, "Process for Preparing α-Amino Penicillins," of C. A. Robinson, filed Oct. 2, 1967.

As stated hereinbefore, the resulting extracts containing the amine derivative of 6-APA are preferably dried thoroughly by any suitable means, such as with the use of drying agents; e.g., anhydrous magnesium sulfate, sodium sulfate, calcium sulfate or silica gel, or by distillation to remove water azeotropically.

Based on the amount of unreacted, free amine remaining in the extract as shown by titration, a sufficient quantity of any suitable strong, secondary or tertiary amine, such as diethylamine, triethylamine, trihexylamine or the like, is added to the extract to ensure the presence of at least a molar equivalent of amine, including the amount of amine present as the amine derivative of 6-APA, for each mole of tri(lower)alkylchlorosilane used in the aforesaid silylation step. Since accurate determinations of these amounts are difficult, it is advantageous to employ an excess of strong amine and subsequently inactivate the excess by addition of a mineral acid salt of a weak amine as described in said U.S. Ser. No. 671,938.

The following examples are illustrative of the invention but are not to be considered necessarily limitative thereof.

Example 1

In a 5 l. 3-neck flask fitted with stirrer, thermometer, and nitrogen inlet, 4100 ml. of an aqueous solution containing 43.2 g. (0.20 mole) of 6-APA and 0.25 mole of hydrochloric acid was treated with a solution of 163 g. (0.44 mole) of Amberlite LA-2 in 700 ml. of methylene chloride, and the mixture was stirred under nitrogen for 10 minutes at 25° C.; pH 4.1. After separating the layers, the aqueous layer was re-extracted with 80 ml. of methylene chloride. Titration assays showed that 29.0 g. (0.134 mole or 67%) of the 6-APA had been removed from the aqueous solution.

The presence of 6-APA in the methylene chloride extract was established by extracting one-tenth of the above methylene chloride layer, containing 2.9 g. of 6-APA by titration assay, with 44 ml. of water at pH 1.1. After adjusting the pH of the water layer to 3.9, 6-APA crystallized; recovery, 2.2 g.; iodometric assay, 929 mcg./mg.

Example 2

The proportions of 6-APA obtained from the aqueous solutions thereof, in accordance with the method of the invention, depends, among other factors, on the amount of amine used, and the pH of the mixtures. This was demonstrated by a series of runs following the procedure of Example 1, but varying the amine, the amounts thereof employed, and the amount of mineral acid added. Results of this series of runs are given in Table B which shows the percentage of 6-APA transferred from the aqueous solution based on assays for the 6-APA remaining in the aqueous solution.

TABLE B

| Amine reactant | Mole ratio amine: 6-APA | Equiv. ratio acid: amine | pH of mixture | 6-APA transferred, percent |
|---|---|---|---|---|
| Amberlite LA-2 | 1.1 | 0.5 | 4.5 | 28 |
| Do | 2.2 | 0.5 | 4.5 | 65 |
| Do | 3.0 | 0.5 | 4.1 | 77 |
| Do | 4.0 | 0.5 | 4.5 | 83 |
| Do | 5.0 | 0.5 | 4.6 | 86 |
| Tri-n-octyl(decyl)amine [1] | 3.0 | 0 | 5.2 | 70 |
| Do.[1] | 3.0 | 0.25 | 4.6 | 78 |
| Do.[1] | 3.0 | 0.5 | 3.8 | 78 |
| Do.[1] | 3.0 | 0.7 | 3.5 | 60 |
| Do.[1] | 3.0 | 1.0 | 2.9 | 29 |
| Do.[1] | 3.0 | 3.0 | 1.0 | 10 |
| Di-n-hexylamine | 3.0 | 0.5 | 6.7 | 62 |

[1] A mixture of tri-n-octylamine and tri-n-decylamine.

Example 3

As referred to hereinbefore, other mineral acids such as sulfuric acid, nitric acid and hydrobromic acid can be used in place of hydrochloric acid. Thus, the procedure of Example 1 was again repeated, but, in these instances using 3 moles of tri-n-octyl(decyl)amine per mole of 6-APA and using different mineral acids to give 0.5 equivalent of acid per mole of amine. These results and the effect of the presence of inorganic salts are given in Table C.

TABLE C

| Mineral acid | Mole ratio salt:APA | 6-APA transferred, percent |
|---|---|---|
| $H_2SO_4$ | 0 | 78 |
| HCl | 0 | 75 |
| HBr | 0 | 74 |
| $HNO_3$ | 0 | 73 |
| $H_2SO_4$ | 0.75 $Na_2SO_4$ | 70 |
| $H_2SO_4$ | 0.75 $K_2SO_4$ | 68 |
| HCl | 1.5 NaCl | 53 |
| HCl | 1.5 KCl | 54 |
| HBr | 1.5 NaBr | 28 |
| HBr | 1.5 KBr | 32 |
| $HNO_3$ | 1.5 $NaNO_3$ | 13 |
| $HNO_3$ | 1.5 $KNO_3$ | 22 |

Example 4

Other solvents for the amine can be employed as was demonstrated by repeating the procedure of Example 1 in toto, but with the substitutions of solvents and amine reactants to obtain the results as given in Table D below:

TABLE D

| Amine | Solvent | 6-APA transferred, percent |
|---|---|---|
| Amberlite LA-2 | Methylene chloride | 65 |
| Do | Ethylene dichloride | 59 |
| Do | Benzene | 34 |
| Do | MIBK | 46 |
| Do | Ethyl acetate | 57 |
| Tri-n-octyl(decyl)amine | Methylene chloride | 65 |
| Do | Carbon tetrachloride | 36 |
| Do | Chloroform | 74 |
| Do | Ethyl ether | 34 |
| Do | Cyclohexane | 12 |

Example 5

In a 1 l. 3-neck flask fitted with stirrer, thermometer, nitrogen inlet tube, and drying tube, was placed 640 ml. of methylene chloride extract prepared as described in Example 1 and dried over "Drierite" to a moisture content of 0.02% which contained 0.12 mole of the Amberlite LA-2 salt of 6-APA and 0.050 mole of free Amberlite LA-2 as shown by titration. To this solution, 8.3 g. (0.08 mole) of triethylamine and 17.5 g. (0.144 mole) of N,N-dimethylaniline were added, the mixture was cooled and 26.0 g. (0.24 mole) of trimethylchlorosilane was added dropwise over 3 minutes at 12–15° C.

The mixture was allowed to reflux for 1¼ hours and cooled under nitrogen to 20° C. Then 20 ml. of a 0.75 molar solution of N,N-dimethylaniline dihydrochloride in methylene chloride was added. After cooling the mixture, 24.8. (0.120 mole) of D(—)phenylglycyl chloride hydrochloride was added portionwise over 20 minutes at −10° C. The reaction mixture was allowed to stir at −10° C. for one-half hour and then warmed to 10° C. over one-half hour.

The reaction mixture was poured into 900 ml. of water at 90° C. with stirring and the two-phase mixture was filtered. After decanting the aqueous layer from the filtrate, the methylene chloride layer was reextracted twice with 900 ml. portions of cold water, each time adjusting the mixture of pH 1.8–2.0 with dilute hydrochloric acid. Ethyl acetate (200 ml.) was added to the combined, clear aqueous extracts followed by the dropwise addition of a solution of β-naphthalene sulfonic acid containing 31 g. (0.15 mole) of active agent and the concurrent addition of dilute sodium hydroxide to maintain a pH of 1.5–1.7.

After stirring overnight at 2–5° C., the white, crystalline naphthalene sulfonic acid salt of ampicillin was collected by filtration, washed thoroughly with cold water and finally with ethyl acetate. A sample dried in a vacuum oven at 50–60° C. showed the wet filter cake (65.2 g.) to contain 63.2% solids.

The wet filter cake was added to a solution of 85 ml. of isopropanol and 7.85 g. of triethylamine at 75–80° C. with rapid stirring and then allowed to stir for 12 minutes. The white, crystalline amplicillin anhydrous was filtered from the hot reaction mixture, washed with 85% aqueous isopropanol, and dried at 45° C.; yield, 20.2 g. or 32% of theory from the 6-APA in the original aqueous solution. Iodometric assay, 984 mcg./mg.

Example 6

To 400 ml. of water, 4.32 g. (0.02 mole) of 6-APA and 30 ml. of 1 N $HNO_3$ are added. The resulting solution is treated with a solution of 24.5 g. (0.06 mole) of tricaprylyl amine in 135 ml. of methylene chloride, and the mixture is allowed to stir at 20–25° C. for 10 minutes; pH 3.9. After separating the layers 6-APA is recovered from the clear methylene chloride phase by extraction with 35 ml. of water at pH 7.6. Adjustment of the resulting aqueous layer to pH 4.0 affords 2.15 g. of crystalline 6-APA after washing and drying; iodometric assay, 996 mcg./mg.

When HCl or $H_2SO_4$ are substituted for $HNO_3$ in the treatment process, 6-APA is isolated in a similar manner.

Example 7

The procedure of Example 1 is followed except the substitution of benzene for methylene chloride as the organic solvent. Presence of 6-APA in the organic phase is shown by isolation of 6-APA (0.6 gm.) from the benzene layer as described in Example 1.

Example 8

To 400 ml. of water, 4.32 g. of 6-APA and 30 ml. of 1 N $H_2SO_4$ are added. The resulting solution is treated with a solution of 14.5 g. (0.06 mole) of 2,2′-diethyldihexylamine in 135 ml. of ethyl acetate, and the mixture is allowed to stir at 20–25° C. for 10 minutes; pH 5.0. After separating the layers, 6-APA is recovered from the clear ethyl acetate layer as described in Example 1; recovery 1.7 g.

Example 9

To 400 ml. of water, 4.32 g. of 6-APA and 25 ml. of 1 N HCl are added. Ten ml. of 1 N NaOH followed by a solution of 13.6 g. (0.06 mole) of tri isoamylamine in 135 ml. of methylene chloride are added to the clear 6-APA solution, and the mixture is allowed to stir at room temperature; pH 5.4. After separating the layers, titration assays show that only 1.7 g. (40%) of the 6-APA remains in the aqueous phase.

Example 10

To 400 ml. of water, 4.32 g. of 6-APA and 42 ml. of 1 N HCl are added. A solution of 11.1 g. (0.06 mole) of dihexylamine in 133 ml. of methylene chloride is added to the 6-APA solution, and the mixture is allowed to stir at 20–25° C. for 10 minutes; pH 5.0. After separating the layers, 6-APA is recovered from the methylene chloride extract by stirring with 40 ml. of water at pH 1.1. Separation of the layers and adjustment of the aqueous phase to pH 4.0 affords 2.07 g. of 6-APA after washing with water and acetone, and drying; iodometric assay, 983 mcg. per mg.

Example 11

Conventional filtered broth, obtained by the enzymatic hydrolysis of penicillin, is chilled, acidified to pH 2.0 with dilute $H_2SO_4$, extracted with amyl acetate and finally with methylene chloride to remove by-products. To 2800 ml. of the aqueous phase, assaying 15,130 mcg. per ml. or 42.4 g. (0.196 mole) of 6-APA, is added 20 ml. of 4 N NaOH and a solution of 145 g. (0.60 mole) of 2,2'-diethyldihexylamine in 1330 ml. of methylene chloride. The mixture is allowed to stir at 18° C. for 10 minutes under nitrogen; pH 4.8. After separating the layers, titration assays show that 72% of the 6-APA has been removed from the broth.

The methylene chloride extract is concentrated under reduced pressure to a volume of 700 ml. and further dried by stirring with "Drierite" overnight. In a 1 l. 3-neck flask fitted with stirrer, thermometer, nitrogen inlet, and drying tube, the filtered methylene chloride extract is treated with 16.6 g. (0.165 mole) of triethylamine and 20.2 g. (0.167 mole) of N,N-dimethylaniline. After cooling the mixture, 30.2 g. (0.278 mole) of trimethylchlorosilane is added at 10–15° C. over five minutes.

The mixture is allowed to reflux for one hour and cooled under nitrogen to 20° C. Then, 12 ml. of a 3.35 N solution of N,N-dimethylaniline dihydrochloride in methylene chloride is added. After cooling the mixture, 29.0 g. (0.140 mole) of D(—)phenylglycyl chloride hydrochloride is added portionwise over 20 minutes at 0 to —10° C. The reaction mixture is allowed to stir for an additional 15 minutes at that temperature and then is warmed to 10° C. over 30 minutes.

The reaction mixture is poured into 900 ml. of water at 8° C. with stirring and the pH adjusted to 1.8 with dilute HCl. Isolation of a sulfonic acid salt of ampicillin and conversion to ampicillin anhydrous as described in Example 5 affords 16.9 g. or 25% of theory from the 6-APA present in the "broth" used as a starting material; bioassay, 943 mcg./mg.

Example 12

Methylene chloride extract (140 ml.), prepared from "broth" as described in Example 11, is extracted with 43 ml. of water at pH 1.5. Adjustment of the resulting aqueous phase to pH 4.0 with 4 N NaOH affords 2.04 g. of 6-APA after washing and drying; iodometric assay, 979 mcg. per mg.

Example 13

To purified broth as prepared in Example 11, containing 4.32 g. of 6-APA by assay, a solution of 16.2 g. (0.06 mole) of tri isohexylamine in 135 ml. of methylene chloride is added followed by 24 ml. of 1 N sodium hydroxide and the mixture is allowed to stir at 20° C. for 10 minutes; pH 5.3. After separating the layers, 6-APA is recovered from the filtered methylene chloride layer as described in Example 12 to afford 1.9 g. after drying.

We claim:
1. A method for preparing an organic solvent solution of a derivative of 6-aminopenicillanic acid particularly suitable for direct use in preparing penicillins by reaction with a silylating agent followed by reaction with an acylating agent, which method comprises:
  (a) providing an aqueous solution of 6-aminopenicillanic acid or a salt thereof;
  (b) treating the solution of the 6-aminopenicillanic acid with an aliphatic amine of the group consisting of straight chain, branched chain, saturated, unsaturated, symmetrical, unsymmetrical, secondary and tertiary amines having at least 12 carbon atoms and a molecular weight of at least about 185, and which is dissolved in a water-immiscible organic solvent devoid of hydroxyl groups, to form a two-phase water and organic solvent mixture;
  (c) separating from said water phase, the organic solvent phase containing the corresponding aliphatic amine derivative of 6-aminopenicillanic acid; and
  (d) then subjecting said organic solvent phase containing the corresponding aliphatic amine derivative of 6-aminopenicillanic acid to a drying treatment.

2. A method for preparing an organic solvent solution of a derivative of 6-aminopenicillanic acid as defined in claim 1, wherein a mineral acid component is present in said mixture in amount to provide from about 0.2 to 0.6 equivalent of acid per mole of aliphatic amine employed for treating said solution, and said mixture is maintained at a pH of from about 3.5 to about 6.5.

3. A method for preparing an organic solvent solution of a derivative of 6-aminopenicillanic acid as defined in claim 2, wherein the mineral acid is selected from the group consisting of hydrochloric acid, hydrobromic acid, sulfuric acid and nitric acid.

4. A method for preparing an organic solvent solution of a derivative of 6-aminopenicillanic acid as defined in claim 3, wherein the aliphatic amine is selected from the group consisting of dihexyl amine, di-n-octyl amine, di-2-ethylhexyl amine, di-lauryl amine, Amberlite LA-1, Amberlite LA-2, tri-octyl amine, tributyl amine, dimethyloctadecyl amine, trioctyldecyl amine, Amberlite XE-204, trilauryl amine, trihexyl amine.

5. A method for preparing an organic solvent solution of a derivative of 6-aminopenicillanic acid as defined in claim 4, wherein the water-immiscible organic solvent devoid of hydroxyl groups is selected from the group consisting of methylene chloride, ethylene dichloride, chloroform, carbon tetrachloride, cyclohexane, benzene, diethyl ether, ethyl acetate, and methylisobutylketone.

6. A method for preparing an organic solvent solution of a derivative of 6-aminopenicillanic acid as defined in claim 5, wherein the amount of amine employed for treating the solution of 6-aminopenicillanic acid or salt thereof is within the range of from about 1 to about 5 moles per mole of 6-aminopenicillanic acid present in said solution.

7. A method for preparing an organic solvent solution of a derivative of 6-aminopenicillanic acid as defined in claim 6, wherein the method of treatment is performed under an inert atmosphere at a temperature of from about 20° to about 25° C.

References Cited

UNITED STATES PATENTS 3,008,956   11/1961   Nettleton _____ 260—239.1

NICHOLAS S. RIZZO, Primary Examiner

U.S. Cl. X.R.

260—239.1